(12) United States Patent
Diamand et al.

(10) Patent No.: US 7,251,328 B2
(45) Date of Patent: Jul. 31, 2007

(54) SYSTEM FOR SECURE DECRYPTION OF STREAMING MEDIA USING SELECTIVE DECRYPTION OF HEADER INFORMATION AND DECRYPTION OF REASSEMBLED CONTENT

(75) Inventors: Joseph Diamand, San Diego, CA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 680 days.

(21) Appl. No.: 10/342,539

(22) Filed: Jan. 14, 2003

(65) Prior Publication Data

US 2004/0139335 A1  Jul. 15, 2004

(51) Int. Cl.
*H04N 5/937* (2006.01)
*H04N 5/935* (2006.01)
*H04N 1/393* (2006.01)

(52) U.S. Cl. .................. 380/205; 380/239; 380/240

(58) Field of Classification Search ............... 380/205, 380/239, 240
See application file for complete search history.

(56) References Cited

U.S. PATENT DOCUMENTS 5,535,276 A   7/1996  Ganesan (Continued)

FOREIGN PATENT DOCUMENTS

EP        0 714 204 A    5/1996

(Continued)

OTHER PUBLICATIONS

Ganesan, Ravi; "Yaksha: Augmenting Kerberos with Public Key Cryptography"; Proceedings of the Sympoisum on San Diego, CA.: 1995, pp. 132-143, XP01034533.

(Continued)

*Primary Examiner*—Gilberto Barrón, Jr.
*Assistant Examiner*—Venkat Perungavoor
(74) *Attorney, Agent, or Firm*—Benjamin D. Driscoll

(57) ABSTRACT

A system provides improved security in a streaming media decoder includes decryption of encoded media information at the media layer, within a decoder component of a playback device. A content source, such as an MPEG-4 media stream from a network, or a file on a local storage device, etc. that contain packetized content, and supplies encrypted and encoded media information. For example, digital sound and image information can be conveyed for presentation. A reassembler component is used to initiate decryption of a nominal amount of information needed to perform further processing at the QuickTime player. Encrypted access units are sent from the reassembler to the decoder, where the decoder causes decryption of the access unit information. This approach prevents decrypted, encoded information from being transferred from the reassembler to the decoder. Such decrypted and encoded information is especially susceptible to copying. Instead, the information transferred from the reassembler to the decoder is largely still encrypted. In a preferred embodiment, an Internet Protocol rights management system (IPRM) is used to perform the decryption processing. The reassembler makes requests of the IPRM process to open a decryption session and decrypt selected packets to identify the window rendering size. The decoder makes requests of the IPRM process to decrypt access units within the same decryption session and to close the decryption session. Because content is encrypted on packet boundaries, and when called upon by the decoder, the IPRM component must recreate the packet boundaries from the access unit before decryption is possible. The IPRM system component is able to do so because the encrypted packets contain an IPRM header that is used by the IPRM system to calculate the packet length. After decrypting all the packets, the IPRM system component reconstructs the decrypted access unit and returns decrypted content to the decoder.

23 Claims, 2 Drawing Sheets

U.S. PATENT DOCUMENTS

| | | | |
|---|---|---|---|
| 5,706,507 A | | 1/1998 | Schloss |
| 5,802,518 A | | 9/1998 | Kitain et al. |
| 5,878,135 A | * | 3/1999 | Blatter et al. ............... 380/239 |
| 6,122,377 A | | 9/2000 | Bromba et al. |
| 6,640,145 B2 | * | 10/2003 | Hoffberg et al. .............. 700/83 |
| 2001/0018743 A1 | * | 8/2001 | Morishita ................... 713/193 |
| 2003/0135730 A1 | * | 7/2003 | Szucs et al. ................ 713/153 |

FOREIGN PATENT DOCUMENTS

| | | | |
|---|---|---|---|
| EP | 0715244 A | | 6/1996 |
| EP | 0 763 936 A | | 3/1997 |
| EP | 0 936 774 A | | 8/1999 |
| EP | 1041823 A | | 10/2000 |
| EP | 1041823 A2 | * | 10/2000 |
| EP | 1089488 A | | 4/2001 |
| EP | 1150198 A | | 10/2001 |
| EP | 1 253 762 A | | 10/2002 |
| WO | WO 97 25798 A | | 7/1997 |
| WO | WO 00/11849 A1 | | 3/2000 |
| WO | WO 00/68764 A | | 11/2000 |
| WO | WO 01 33320 A | | 1/2001 |
| WO | WO 01/56249 A1 | | 8/2001 |
| WO | WO 01 98903 A | | 12/2001 |
| WO | WO 01/99374 A2 | | 12/2001 |
| WO | WO 03/045038 A2 | | 5/2003 |

OTHER PUBLICATIONS

Kohl, J., et al.; "The Kerberos Network Authentication Service (V5)"; Network Working Group Request for Comments, 1993 pp. 1-97 No. 1510, XP002929784.

Christin, Nicolas; "Multicasting of Real-Time Data RTP, RTCP, RTSP"; 'Online! Nov. 9, 1999. Retrieved from the Internet: , URL:http://www.sims.berkeley.edu/christin/talks/rtp.pdf> retrieved on Nov. 3, 2003.

Schulzrinne, H., et al.; "RTP: A Transport Protocol for Real-Time Applications"; RFC 1889; 'Online! XP002260412; Retrieved from the Internet: ,URL:www.ietf.org>; retrieved on Nov. 3, 2003.

* cited by examiner

SYSTEM FOR SECURE DECRYPTION OF STREAMING MEDIA USING SELECTIVE DECRYPTION OF HEADER INFORMATION AND DECRYPTION OF REASSEMBLED CONTENT

CROSS-REFERENCED TO RELATED APPLICATIONS

This invention is related to the following U.S. Patents that are hereby incorporated by reference as if set forth in full in this document for all purposes:

U.S. patent application Ser. No. 10/092,347, entitled, KEY MANAGEMENT PROTOCOL AND AUTHENTICATION SYSTEM FOR SECURE INTERNET PROTOCOL RIGHTS MANAGEMENT ARCHITECTURE, filed Mar. 4, 2002;

U.S. patent application Ser. No. 10/153,445, entitled, ASSOCIATION OF SECURITY PARAMETERS FOR A COLLECTION OF RELATED STREAMING PROTOCOLS, filed May 21, 2002;

U.S. Pat. No. 10/183,130, entitled, ENCRYPTION OF STREAMING CONTROL PROTOCOLS AND THEIR HEADERS, filed Jun. 25, 2002; and, U.S. patent application Ser. No. 10/125,294, entitled, DIGITAL RIGHTS MANAGEMENT SYSTEM FOR CLIENTS WITH LOW LEVEL SECURITY, filed Apr. 17, 2002.

BACKGROUND OF THE INVENTION

This invention is related in general to decryption of digital information and more specifically to a system for securely decrypting streamed digital media such as digital video played back at a set-top box or computer system.

A typical streaming media system uses codecs for compression, streaming formats for content delivery, and players for recreating the content at the end user's site. Codec formats include Indeo R3.1 Video Codec from Intel and Cinepak Video Codec from SuperMatch. Streaming formats are based on protocol families, such as RTP/RTCP as standardized by the IETF. Player frameworks include Quick-Time from Apple Computer, Inc., RealOne from Real Networks, etc., that use plug-ins or other mechanisms that support processes to decode audio and/or visual information for a presentation. For example, QuickTime is a popular framework for streaming the standard promulgated by the Motion Picture Experts Group (MPEG) known as MPEG-4. By modifying the content information according to the coding and decoding rules of the codec the size of the information is reduced. The resulting compression ratio is very useful to reduce requirements of a communication channel, such as the Internet, to stream the production to potentially many thousands of users for presentation. A user's playback platform includes a processor that executes the codec. The production can be captured and streamed in real-time (e.g., a "live" presentation), or the production can be a pre-recorded (i.e., stored) file. In either case, the production is transferred to a user or users in a unicast, broadcast, multicast or other distribution scheme.

Security is an important aspect of streamed media. Content owners and distributors desire to limit streamed media production availability only to those users who are paying customers. One way to enforce ownership rights is to encrypt the streamed information so that it is not subject to viewing, copying, transfer or other handling by unauthorized persons. Of course, the production must be decrypted at some time prior to presentation to a user. A security weakness is created at the point in a playback system where the information has been decrypted and is "in the clear." Such decrypted information is more readily subject to unauthorized use.

Today's streamed media is usually streamed over digital networks, such as the Internet, corporate or campus intranets, local area networks (LANs), home networks, etc., via packet-oriented protocols such as User Datagram Protocol (UDP) or Transfer Control Protocol/Internet Protocol (TCP/IP). A packet is a small unit of the digital information. Packets can be sent or received out-of-order. As such, a receiver, or playback device, must re-assemble the received packets in addition to performing decoding and decryption operations.

FIG. 1A is a prior art diagram illustrating an exemplary streaming media playback device that includes the functions of re-assembly, decryption and decoding.

In FIG. 1A, encoded and encrypted packets 20 making up streaming media content are obtained from a source such as Internet 10. The packets are received by a user's playback device 30, or other platform such as a television set-top box, and are transferred internal to the playback device via bus 32. Note that the packets transferred on bus 32 are still encrypted and so security is maintained.

Reassembler 34 obtains the encrypted, encoded packets and decrypts them by utilizing decryption resource 40. Reassembler 34 typically needs to perform decryption prior to reassembly of the packets because, in general, the content is encrypted at the packet level in order to facilitate network transport. Packets must be reassembled in order to perform the decoding process as the units of information that are handled by the decoding process usually include many packets of information. The reassembled packets are used to derive access units according to the encoding format (e.g., MPEG-4 format). In generating the access unit, the reassembler must strip off all the packet header information and piece together the packet payloads in order to reassemble the access unit. As such, once the decoder processes the access unit, it is unaware that the access unit was ever packetized, and, in general, is not capable of determining where the packet boundaries were.

Assembled and decrypted information is transferred via bus 36 to a decoder 38 (e.g., MPEG-4 video decoder) for eventual display on output devices such as a video screen for video, rendered to the system's speaker for audio media, etc., shown at 50. Note that in the approach of FIG. 1A, unencrypted information is output by reassembler 34 onto bus 36. This provides a point at which the information can be obtained for unauthorized use. This point in the system is even more appealing to a would-be DRM violator since the information is both unencrypted yet still encoded. In other words, the information is readable and is still in a compact form (e.g., some 30 times or more smaller than decoded) so that it can be more easily copied, stored, transferred, sold, etc.

SUMMARY OF THE INVENTION

Improved security in a streaming media decoder includes decryption of encoded media information at the media layer, within a decoder component of a playback device. The content source is a media stream from a network or a file on a local storage device that was saved in packetized format. In either case, the content source supplies encrypted and encoded media information. For example, digital sound and image information can be conveyed for presentation.

A preferred embodiment of the invention is designed for presenting MPEG-4 streaming media in a QuickTime player on a PC. A reassembler component is used to initiate decryption of a nominal amount of information needed to perform initialization of the QuickTime player. Encrypted packets are reassembled into access units and are sent from the reassembler to the decoder. The decoder causes decryption of the reassembled access unit and then performs decoding of the decrypted encoded access unit information into decoded frames for presentation on the associated rendering device. This approach prevents decrypted, encoded information from being transferred from the reassembler to the decoder. Such decrypted and encoded information is especially susceptible to copying. Instead, all, or selected portions, of the information transferred from the reassembler to the decoder can remain encrypted.

In a preferred embodiment, an Internet Protocol rights management system (IPRM) is used to perform the decryption processing. The reassembler makes requests of the IPRM process to open a decryption session and decrypt only one or a small number of selected packets necessary for the player to be initialized. The decoder makes requests of the IPRM process to decrypt all the access units within the same decryption session and to close the decryption session when all the content has been decrypted.

As applied to the MPEG-4 video format, the reassembler decrypts packets searching for the MPEG-4 VOL header needed to establish the size of a rendering window for the QuickTime media layer. Other approaches can use decryption at the reassembler to obtain more or less information, as desired.

In one embodiment the invention provides an apparatus for decrypting encrypted, encoded digital media information for presentation. The apparatus includes a reassembler for receiving encrypted packets from a packet source. The apparatus further includes a decoder coupled to the reassembler for decoding the encoded digital media information and a decryption resource coupled to the reassembler and to the decoder for decrypting encrypted information.

DETAILED DESCRIPTION OF THE INVENTION

Figure 1A:
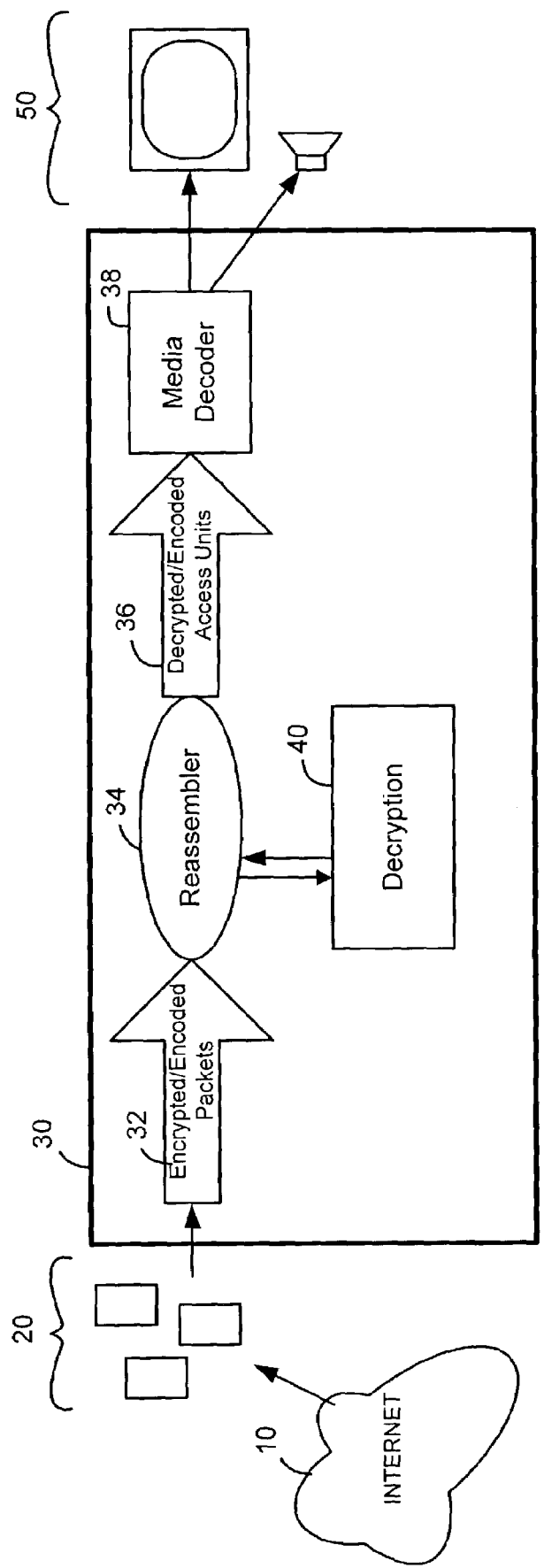
FIG. 1A illustrates decryption and decoding in a playback device according to the prior art.
Figure 1B:
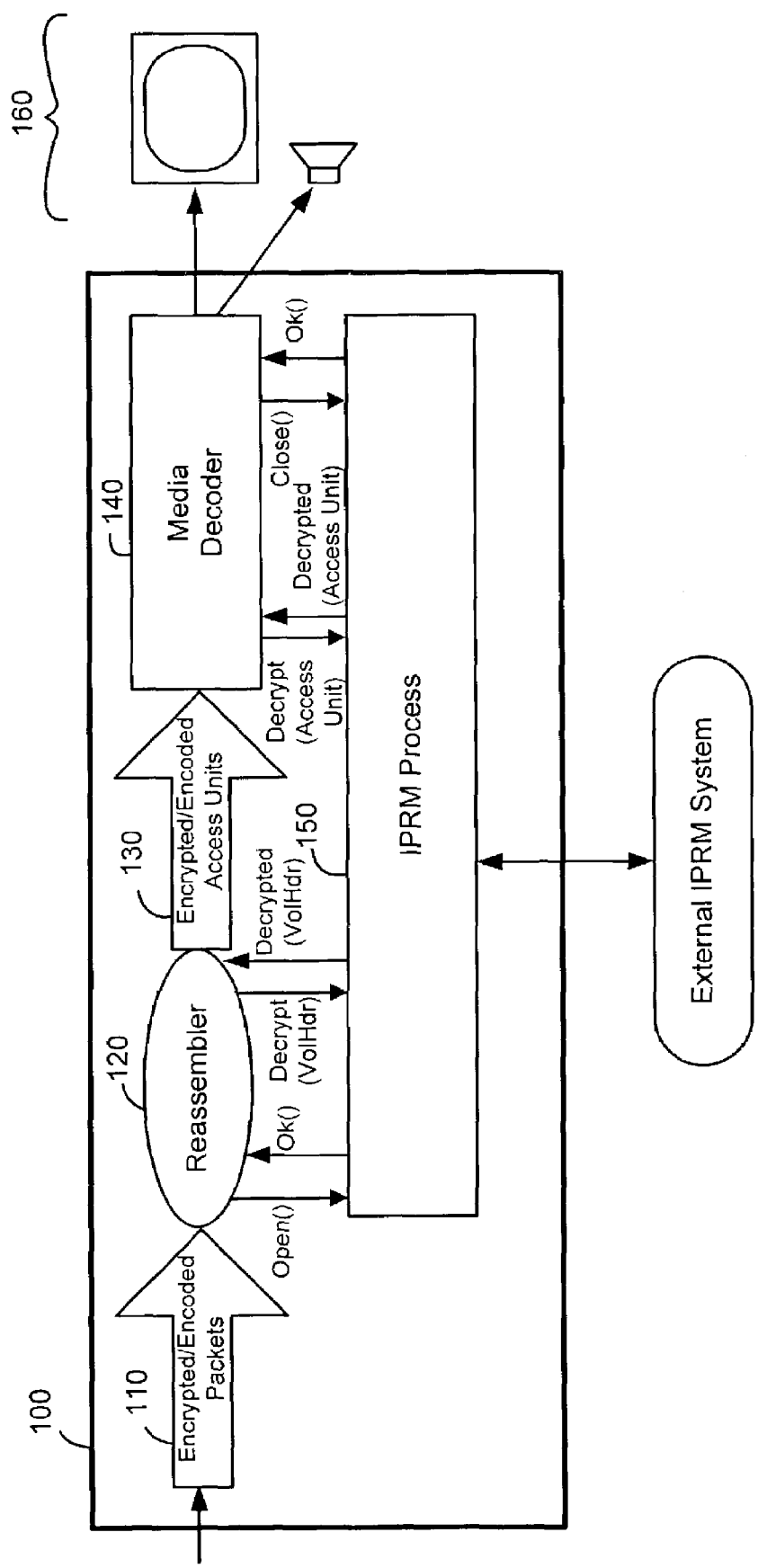
FIG. 1B illustrates decryption and decoding in a playback device according to the present invention.

FIG. 1B shows decryption and decoding of media information according to the present invention.

In FIG. 1B, playback device 100 includes a connection, such as bus 110, to a streaming media information source. In a preferred embodiment, the media information source includes the Internet, local area network (LAN), home network or other digital network. The source can also include a local storage device such as a magnetic hard disk, compact disk—read only memory (CDROM), digital versatile disk (DVD), random access memory (RAM), read-only memory (ROM), etc. when the content is stored in encrypted packet format for direct processing by a player and requiring reassembly. In general, the media information can be obtained from, or generated by or at, any place or time and conveyed to the playback device by any suitable structure or method.

Playback device 100 is, preferably, a consumer cable television set-top box, or other processing device or computer system. Although the invention will be discussed primarily with respect to the MPEG-4 format and the QuickTime player, any suitable format or formats can be used. Details on these standards and frameworks can be obtained, from www.mpeg.org and from www.apple.com, respectively. Media information is received from the media source in the form of packets of data, as is known in the art. For example, a network transport layer that allows 1500 byte packets can be employed. In general, any size packets, or other units of data, can be employed with any protocol on any transport layer.

Media content information is processed before being sent to playback device 100. The media information is encoded to achieve compression to reduce the size of the data. The encoded data is then separated into small units and a header is attached to each unit to form packets for transfer across a digital network to a target destination according to a packet-oriented protocol such as UDP.

The packets are encoded and encrypted prior to reception at playback device 100. Reassembler 120 is a component within playback device 100. Since packets may be received out-of-order, reassembler 120 acts to place the packets of information back into proper order. Reassembler 120 also can perform other link-level tasks such as error checking, requesting lost or corrupted packets, etc.

The reassembler of the present invention is used to decrypt a small amount of information, such as video header information, that is necessary for subsequent operation of the playback device, such as the QuickTime video renderer. The reassembler extracts the encrypted payloads from the packets, and uses these encrypted payloads to reconstruct the access unit, so content sent via bus 130 to media decoder is still encrypted. As such, all the packet header information is discarded from the content received at media decoder. Media decoder causes decryption of the information and also decodes the information so that the original content can be presented as, e.g., audio or video playback, on output device 160.

In the preferred embodiment, the reassembler obtains header information by decryption of one or a few packets. This provides parameters and information necessary for further processing. For example, the type of encoding, size of a rendering window, etc., can be obtained by decryption of information at the reassembler. The player within which the reassembler is operating is provided with the necessary information by the reassembler for player initialization so that further decryption, decoding and presentation of the information can be achieved at the player.

Note that with the approach of the present invention there is less opportunity for unauthorized copying of useful data. A large portion of the media information is not fully decrypted until it is processed in the decoder just prior to presentation. Also, the ability to obtain media information that is both unencrypted and decoded is minimized. While it is possible to obtain unencrypted, decoded information at the output of media decoder, such decoded information is some tens of times larger than the encoded information so that the required higher transfer speed and storage capacity may hamper unauthorized copying, transmission, or other use of the information.

In other embodiments, different degrees of decryption can be performed by the reassembler and decoder, or by other components, as desired. For example, even when significant portions of information are sent decrypted and encoded from the reassembler to the decoder, the fact of at least some of the information being encrypted can make copying of the information at bus 130 less desirable. Even the occurrence of a few sporadic frames of video images, or fractions of a second of lost audio, due to remaining encryption of small portions of the information will cause an unauthorized copy to be unwanted and essentially unmarketable and undesirable.

As discussed, the preferred embodiment obtains information from the MPEG-4 VOL header. Since this information is necessary for further processing at the player, the information is obtained at the beginning of a decryption session at the reassembler. With MPEG-4 streamed media that is stored in a file and delivered on demand, the header information is known to be in a first packet. Thus, in this case only the first packet need be decrypted by the reassembler component, assuming the packet arrives and is not corrupted. For a live, streamed, broadcast of media information, where a user may start reception at any point after the start of the broadcast, the header information is rebroadcast and must be obtained from a next self-contained access unit, referred to as an I-frame. Other approaches, especially where different encoding formats and transfer protocols are used, can selectively decrypt different types and amounts of information at the reassembler or at the decoder.

The preferred embodiment of invention utilizes an Internet Protocol rights management system (IPRM) to achieve decryption. Portions of IPRM process 150 can be located, in whole or in part, locally or remotely to playback device 100. The IPRM process of the present invention communicates with reassembler and decoder components in a decryption session. Details of the IPRM process and session commands and exchanges can be found in the co-pending patent application(s) referenced, above. Additional IPRM system processes may be executed remotely at processors on the Internet (not shown) that communicate with IPRM process 150, reassembler 120 and media decoder to assist with key management and/or authentication.

A decryption session is initiated by the reassembler sending an open( ) request. IPRM process 150 initiates the session and acknowledges the initiation with an ok( ) message sent back to the reassembler. IPRM Header information can then be used for the bulk of the decryption, which occurs between media decoder and IPRM process 150. The decoder sends reassembled access units that contain encrypted payload data from the packets to the IPRM process. The IPRM process uses the IPRM header information to locate the former packet boundaries in the encrypted access unit. The IPRM process then decrypts the content on a packet payload basis, since content was originally encrypted on packet boundaries. The IPRM system then reassembles the decrypted access unit from the decrypted packet payloads. The IPRM process then returns the decrypted access unit back to the decoder. When the decoder has processed all the content, it requests closing the session and is provided with an acknowledgement of session closing.

A preferred embodiment uses an IPRM process described in more detail in co-pending patents, U.S. patent application Ser. No. 10/092,347, entitled, KEY MANAGEMENT PROTOCOL AND AUTHENTICATION SYSTEM FOR SECURE INTERNET PROTOCOL RIGHTS MANAGEMENT ARCHITECTURE, filed Mar. 4, 2002 and U.S. patent application Ser. No. 10/125,294, entitled, DIGITAL RIGHTS MANAGEMENT SYSTEM FOR CLIENTS WITH LOW LEVEL SECURITY, filed Apr. 17, 2002, referenced above. Note that many other types of IPRM process approaches can be used. In the preferred embodiment IPRM process 150 of FIG. 1B is software that communicates with external hosts, servers, or other devices according to the description of the IPRM process in the co-pending patent applications. IPRM process 150 obtains tickets and keys to obtain rights to sessions and decryption of content. For example, a user may be receiving packets for a pay-per-view television program. When IPRM process 150 requests initiation of a decryption session, external portions of the IPRM system are invoked to authenticate the user, check that the user is entitled to access the television program, and generate an appropriate ticket. Other embodiments may place some of these, or other, external IPRM functions within IPRM process 150. IPRM process 150 can include hardware, software or a combination of both.

In the preferred embodiment, the decoder is a software function and is part of another application such as a software player or browser. Whichever application hosts the decoder, that application also hosts the IPRM process 150 and is used to establish a secure session with the external IPRM system. After establishing the session, decryption and authentication keys are known and either of the reassembler or the decoder can request that IPRM process 150 decrypt individual packets. However, the preferred embodiment uses the decoder to request the decryption by the IPRM process 150.

As mentioned, the reassembler only needs to decrypt one packet to obtain the necessary information for the decoding to begin. When the decoder sees the first access unit it also attempts to establish a secure session with the IPRM process. But at this point the session has already been established by the hosting application so the IPRM process 150 can decrypt the first access unit without any key exchange with the external IPRM system. An extra benefit is that the decoder does not need to negotiate initiation of a session and key exchange, but can use the same session and keys that were invoked by the reassembler. The decoder thereafter requests the IPRM system to decrypt each and every access unit and, upon processing of the last access unit, will close the session with the IPRM system.

In the preferred embodiment, the IPRM system is repeatedly invoked with a single access unit, until all the access units have been processed. The IPRM system then identifies all the prior packet payload boundaries in the access unit that were merged together by the reassembler. The IPRM system finds the first packet payload boundary by using information at the beginning of the access unit, which is the IPRM header for the first packet payload boundary. The IPRM system then determines each subsequent packet in the contiguous group of packets in the access unit by using the size of the packet payload as stored in the IPRM header. The IPRM system can detect when the last packet payload in an access unit is obtained since the decoder also sends the size of the access unit to the IPRM system. Other embodiments can use other ways to parse access units, packets or other groups, portions or organizations of data in media streams.

Although the invention has been described with reference to specific embodiments, these embodiments are merely illustrative, and not restrictive, of the invention. For example, although the present invention has been discussed primarily with respect to the QuickTime framework, and MPEG-4, any type of framework, codec, protocol, standard, etc., can be suitable for use with one or more aspects of the invention. Although specific functions are discussed as occurring at a user's playback platform, any of the functionality described herein can be implemented by one or more processors at any point in time or place. For example, concurrent, parallel, distributed, etc., approaches to processing can all be employed. Any manner of hardware, software or a combination of both can be used to achieve the functionality of the invention.

Although the invention has been applied to streamed media content, the invention can advantageously be applied to other types of digital information, such as playback of content files that are local to a user's location, e.g., stored on a hard disk, DVD or other media, as long as the content has been saved in packetized format and requires reassembly.

The IPRM process and/or system can be a digital rights management (DRM) service that is accessed remotely, a local decryption resource such as a secure hardware decryption chip, or any other decryption resource. Portions of the IPRM can be local to the playback device and portions can be remote.

Thus, the scope of the invention is to be determined solely by the appended claims.

What is claimed is:

1. An apparatus for decrypting encrypted, encoded digital media information for presentation, the apparatus comprising;
   a reassembler for receiving encrypted packets from a packet source, wherein a plurality of the packets include encoded digital media information and a first packet of the plurality of packets includes first information describing a size of a rendering window for playing-back the encoded digital media information wherein the reassembler generates access units from the encoded digital media information;
   a decoder coupled to the reassembler for decoding the encoded digital media information wherein the decoder receives decrypted first information from the reassembler and the access units from the reassembler; and
   a decryption resource coupled to the reassembler and to the decoder for decrypting the first information for the reassembler and for decrypting second information for the decoder.

2. The apparatus of claim 1, wherein MPLG-4 format is used to encode the digital media information.

3. The apparatus of claim 2, wherein the size of the rendering window is included in a VOL header of the MPLG-4 format.

4. The apparatus of claim 1, wherein the digital media information includes streaming media.

5. A method for decrypting media information in a presentation device, wherein the presentation device includes a reassembler coupled to a decoder, the method comprising:
   decrypting a first portion of the media information at the reassembler;
   decrypting a second portion of the media information at the decoder which includes re-decrypting content that was already decrypted by the reassembler and forwarded in an original encrypted state to the decoder;
   passing an encrypted access unit from the reassembler to the decoder;
   decrypting the encrypted access unit at the decoder; and
   wherein at least a portion of the media information is in MPLG-4 video access units format.

6. The method of claim 5, further comprising:
   decrypting a first portion of the media information in the reassembler to obtain a size of a rendering window to be used for playback of the media information.

7. The method of claim 6, wherein the first portion of the media information is included in an MPLG-4 VOL header.

8. The method of claim 7, wherein the media information is delivered as video-on-demand content, the method further comprising obtaining the VOL header from a first packet.

9. The method of claim 7, wherein the media information is obtained as a live broadcast, the method further comprising decrypting packets in the reassembler until an I-frame containing the VOL header is obtained.

10. The method of claim 5, wherein information is decrypted at the reassembler until initial header information is obtained.

11. The method of claim 5, further comprising using an Internet Protocol Rights Management, IPRM, process to perform decryption, wherein the IPRM process is in communication with the reassembler and the decoder.

12. The method of claim 5, further comprising using the reassembler to initiate a decryption session with an Internet Protocol Rights Management, IPRM, process.

13. The method of claim 12, further comprising using the decoder to close the decryption session with the IPRM process.

14. The method of claim 13, further comprising using the reassembler to request decryption of a packet containing volume header information from the IPRM process.

15. The method of claim 14, further comprising using the decoder to request decryption of access unit information.

16. The method of claim 15, wherein the access unit information is included into a plurality of packets.

17. The method of claim 15, wherein access unit information sent to the IPRM process does not include packet header information that delineates packet boundaries.

18. The method of claim 15, further comprising decomposing an access unit sent to the IPRM process into packet payload boundaries used during encryption; and decrypting the packets resulting from the step of decomposing.

19. The method of claim 18, further comprising passing the length of an access unit to the IPRM process.

20. The method of claim 18, further comprising using the IPRM system to extract IPRM header information from the access unit to identify the length of a packet.

21. The method of claim 20, further comprising using the identified length of a packet to determine the starting point of a next packet payload boundary.

22. The method of claim 15, wherein the IPRM process is used to decrypt packets and reassemble the decrypted packets into an access unit.

23. The method of claim 15, wherein the IPRM process is used to return a decrypted access unit to the decoder.

* * * * *